United States Patent [19]
Salicini

[11] Patent Number: 5,170,872
[45] Date of Patent: Dec. 15, 1992

[54] SYNCHRONIZER FOR ACTIVATING AND DE-ACTIVATING A DOG CLUTCH, PARTICULARLY IN ARTICLE-WRAPPING MACHINES

[75] Inventor: Sandro Salicini, Bologna, Italy

[73] Assignee: Carle & Montanari S.p.A., Bologna, Italy

[21] Appl. No.: 774,498

[22] Filed: Oct. 10, 1991

[30] Foreign Application Priority Data

Oct. 18, 1990 [IT] Italy .................. 12526 A/90

[51] Int. Cl.$^5$ .................. F16D 23/04; F16H 29/12
[52] U.S. Cl. .................. 192/48.2; 192/48.5; 192/67 A; 74/125.5; 74/393
[58] Field of Search .................. 192/48.2, 48.5, 48.7, 192/67 A; 74/113, 125.5, 393; 53/203, 389.3, 493

[56] References Cited

U.S. PATENT DOCUMENTS

| | | | |
|---|---|---|---|
| 2,877,657 | 3/1959 | Scott et al. | 74/125.5 X |
| 3,830,349 | 8/1974 | Williams | 192/67 A X |
| 5,094,327 | 3/1992 | Fischer et al. | 192/67 A X |

Primary Examiner—Richard Lorence
Attorney, Agent, or Firm—Lowe, Price, LeBlanc & Becker

[57] ABSTRACT

The outputs (17–18) of a pair of intermittence devices (16) operated in phase with a clutch driving shaft (6), clutch however, generate equal movements, however in a 180° out-of-phase relation with each other. With the interposition of respective electromagnetic friction clutches (27–28), these outputs are connected to the driven disc of the clutch. The two clutch discs are normally interconnected by at least one respective dog (9–10). A control logic (22) connected to a generator of clock signals (K1–K2) in phase with the uniform motion and rest times of the outputs from the intermittence devices, commands the clutch to be opened and closed, when the friction clutch at the selected output is closed, and when the said output travels at the same speed as the input into the intermittence devices. The selected clutch is each time closed and opened in phase with the said clock signals, and when the output from the intermittence devices and the driven disc of the clutch are in the same condition of motion, or of rest.

3 Claims, 4 Drawing Sheets

SYNCHRONIZER FOR ACTIVATING AND DE-ACTIVATING A DOG CLUTCH, PARTICULARLY IN ARTICLE-WRAPPING MACHINES

BACKGROUND OF THE INVENTION

Article-wrapping machines are usually provided with a rotating knife which severs a continuous web to form wrappers therefrom to enwrap articles. In the majority of the presently-used wrapping machines, when an article to be wrapped is absent, the knife and web-feeding unit are stopped to discontinue the production of wrappers. This discontinuance requires the installation, in the kinematic chain which actuates the knife and web-feeding unit, of a dog clutch capable of timely re-activating said unit and the knife connected thereto.

Due to the high operating speed of the modern wrapping machines, the dogs of this clutch experience considerable mechanical stress during re-activation step, with the disadvantages resulting from this condition.

SUMMARY OF THE INVENTION

An object of the invention is to overcome the above disadvantages by means of the following solution. First of all, the two discs of the clutch are provided each with only one dog. The driven part of the clutch is connected, through a rigid drive with interposed respective electromagnetic friction clutches, to a pair of intermittence devices of equal characteristics, 180° out of phase from each other and connected at the inputs thereof to the same shaft which actuates the driving part of he clutch. Each intermittence device produces at the output thereof a variable motion which changes as follows at 60° intervals:

it rotates at the same speed as the input shaft;
  it decelerates stop to a stop;
  it is maintained stationary
  it accelerates to the same speed as the input shaft.

The driving shaft of the clutch has mounted thereon a generator which produces clock signals for each revolution of the shaft which are 180° out of phase from each other. One of these signals is concurrent with the coincidence of a recess in the clutch-driving cam with the respective disengagement roller. During normal operation of the wrapping machine, the dog clutch is engaged and the friction clutches of the intermittence devices are de-energized. In case of absence of an article, the action of the clutch-disengagement roller is commanded and when the roller enters the recess in the respective cam, the electromagnet of the stoppage intermittence device is energized which at that moment produces through 60° at the output thereof a motion which is equal to the input motion. During this step, the friction clutch becomes engaged with no fretting. Prior to termination of the equal motion condition, the dog clutch is disengaged. Thereafter, the driven disc of the dog clutch, which is controlled by the stoppage intermittence device, slows down and then stops and during the stoppage period the friction clutch of the intermittence device is de-energized. The dog of the driven disc of the dog clutch, therefore, is out of phase with respect to the dog of the driving disc, to such an extend whereby every time the dog clutch re-engages due to the action of the low contour of the disengagement cam, the two dogs never interfere with each other.

In the presence of an article, upon reception of a clock signal for engagement of the dog clutch, the retraction is controlled of the roller for the disengagement cam. At this same moment and through sixty degrees, the output of the starting intermittence device is at a standstill. The energization of the friction clutch is then commanded. Thereafter, the driven disc of the dog clutch is accelerated and the respective dog is reached by the dog of the driving disc, whereafter both discs will rotate at the same speed. In the sixty degree interval wherein the starting intermittence device maintains the driven disc at he same speed as the driving disc, when the other clock signal is reached, the friction clutch of the intermittence device is de-energized and the driven disc is controlled solely by the driving disc.

In the apparatus of the invention, therefore, the rotating knife which forms the wrappers can be timely stopped and re-activated, avoiding the harmful mechanical stressed which presently affect the dogs of the clutch upon each re-activation.

BRIEF DESCRIPTION OF THE DRAWINGS

Further characteristics of the invention, and the advantages resulting therefrom, will become apparent from the following description of a preferred but not sole embodiment thereof, shown merely as a non-limiting example in the accompanying drawings, wherein.

DESCRIPTION OF THE PREFERRED EMBODIMENTS

Figure 1:
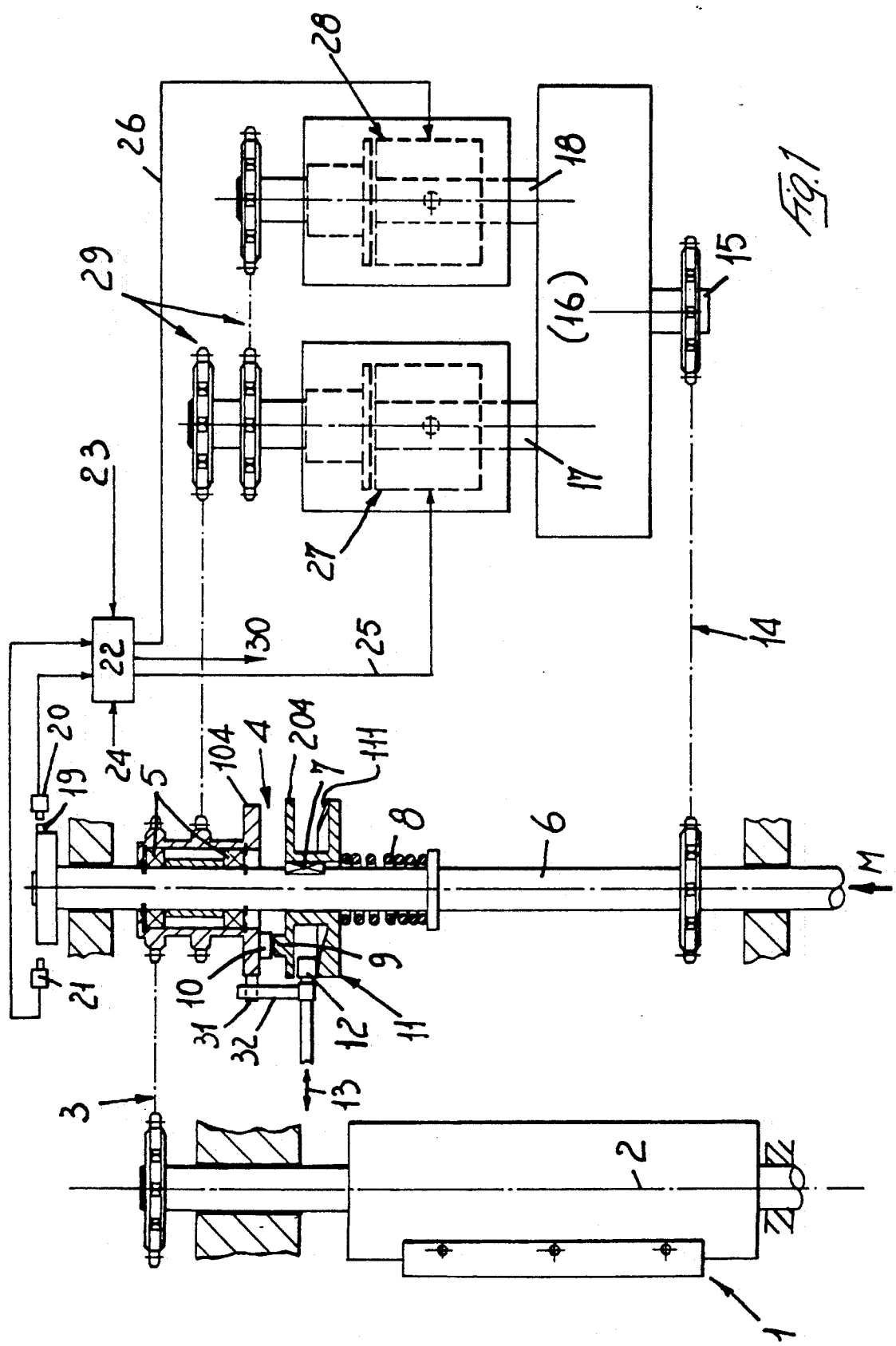
FIG. 1 is a diagrammatic plan view and partly sectional view of the synchronizer according to the invention, the clutch being disengaged.

In FIG. 1, a wrapper-forming knife 1 is rotated about its drive axis 2 through a rigid drive 3 (e.g., chain and sprocket type). Knife 1 is connected to the driven disc 104 of a dog clutch 4 which, in the illustrated example, is rotatably supported with bearings 5 on a driving shaft 6 connected to the prime mover M of the machine and which is supposed to be continuously rotating. The driving disc 204 of the dog clutch is keyed on the shaft 6, as at 7, and is axially movable thereon against the action of a spring 8 which biases against the disc 104. The discs 104 and 204 are each provided with a dog, shown at 9 and 10, respectively.

The hub of the driving disc 204 is integrally formed with a cam 11 for disengaging the dog clutch. The cam is formed with a low contour (as at 111) having an angular amplitude of about 60°. Cam surface 111 receives under command a roller 12 carried by a mechanism which can move perpendicularly to shaft 6, as indicated by arrow 13.

Figure 2:
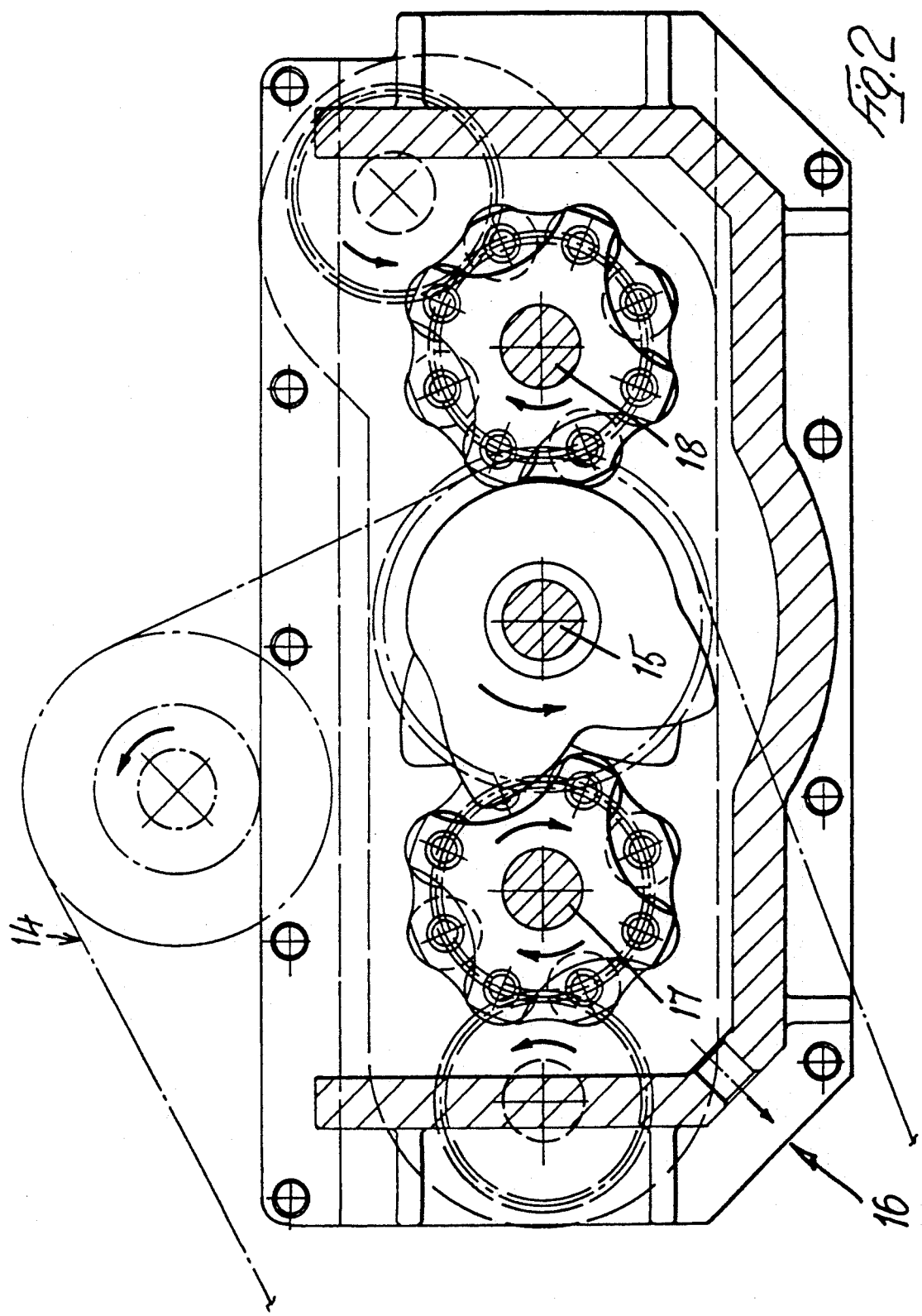
FIG. 2 is a front elevational view of the double intermittence device used in the apparatus according to the invention.

According to the invention, the shaft 6 or any other suitable member of the kinematic chain of the machine is connected, via a positive drive 14, to the input of a double intermittence device 16 having parallel axes, for example, of the type shown in FIG. 2 and known under the name "Parablock". Reference numerals 17 and 18 indicate the two parallel outputs of the intermittence device. The two intermittence devices incorporated in the unit 16 are equal to each other, are 180° out of phase to each other and are characterized in that they provide at the outputs 17-18 a variable motion that, at suitable intervals (for example, 60°) changes as follows:

a—it proceeds at the same speed as the input shaft;
b—it slows down to a stoppage;
c—it keeps still;
d—it accelerates up to the same speed as the input shaft.

Figure 3:
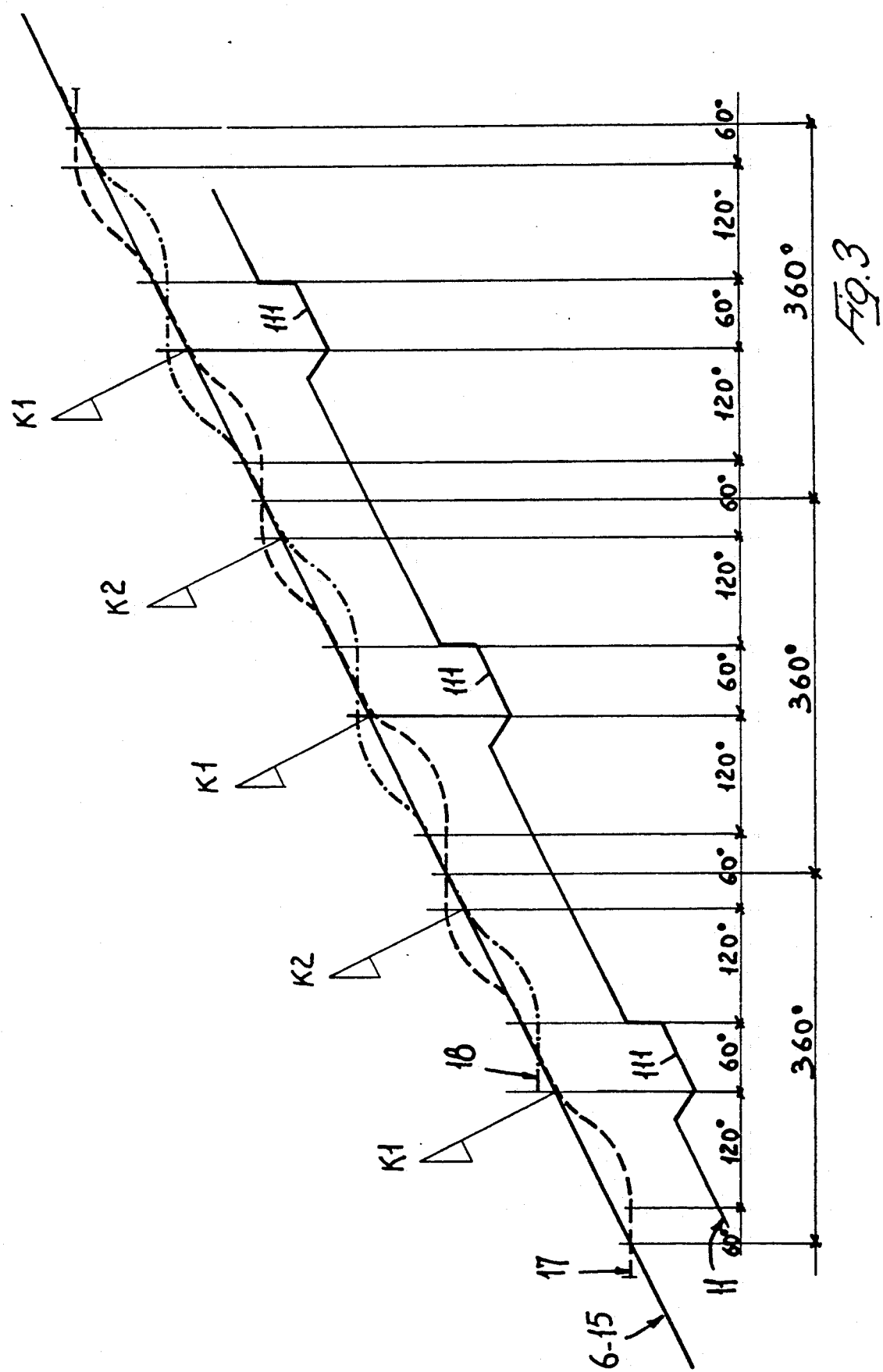
FIG. 3 is a diagram of the motions of the input and output shafts of the double intermittence device.

FIG. 3 shows, by a broken line and a dot-and-dash line, the motion variations of the outputs 17-18, and by a solid line is shown the motion of the input 15 and the shaft 6. From this diagram it appears that when the output 17 is at a standstill the output 18 is moving, and when any one of said outputs accelerates, the other one decelerates. In the same diagram of FIG. 3, 11 indicates the development of the contour of the disengagement cam of the dog clutch 4, the recess 111 being timed with the movements a- and c- of the outputs 17-18 of the double intermittence device.

K1 and K2 indicate clock signals which are 180° out of phase from each other, the former beginning substantially at the beginning of the steps a- and c- mentioned above. These signals can be generated, for example, by a cam 19 which is keyed on the shaft 6 and is scanned by two stationary sensors 20-21 which are spaced 180° apart. The signals from the two sensors flow into a control logic 22 having connected thereto a terminal 23 from a sensor which detects the presence of an article at or towards the wrapping station. Reference numeral 24 indicates a power input, and the reference numerals 25, 26 indicate the corresponding terminals which are connected to the electromagnetic friction clutches 27, 28 arranged between the outputs 17, 18 and a positive composite drive 29, e.g. of the chain-and-sprocket type, connected to the drive 3 connecting the dog clutch 4 to the knife 1.

Finally, reference numeral 30 indicates the terminal controlling the displacement 13 of the roller 12.

Figure 4:
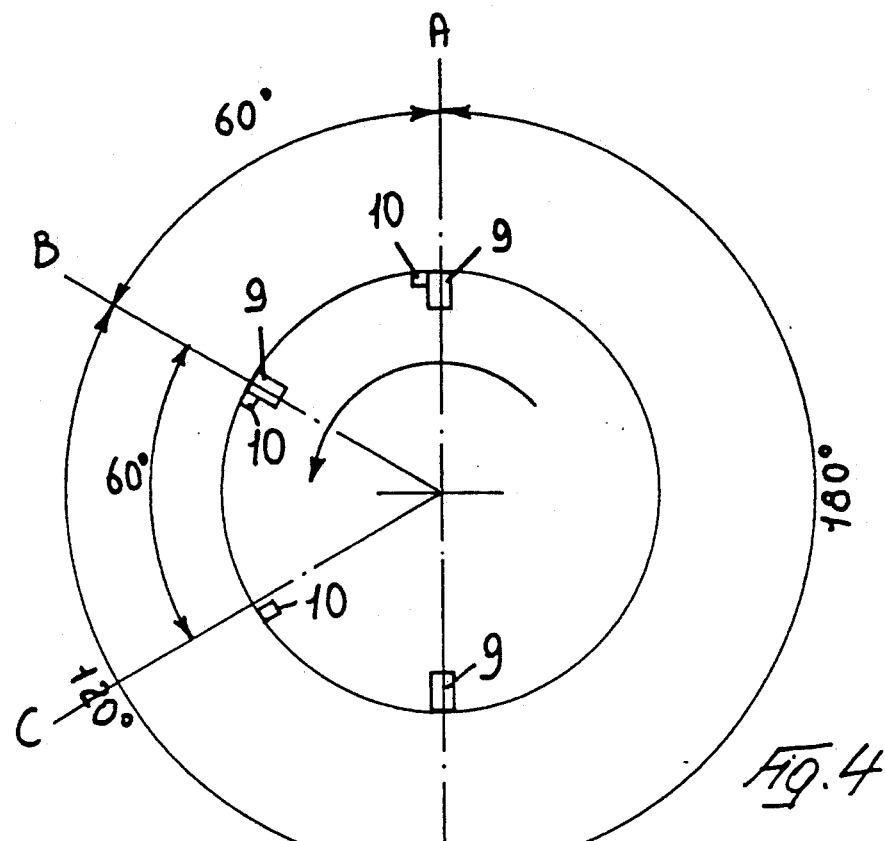
FIGS. 4 and 5 are angular diagrams of the various mutual positions of the dogs of the clutch during the stoppage and starting steps of the driven disc of said clutch.

The above apparatus operates as follows:

In the presence of an article, the friction clutches 27, 28 are disengaged and the dog clutch is engaged. The roller 12 is in its rest position, away from the cam 11. If a signal of absence of an article comes from the terminal 23, the unit 22 causes, via the terminal 30, the approach of the roller 12 to the cam 11. When the roller 12 enters the recess 111 of the cam, the group 19, 21, 22 generates the clock signal K1 which activates the friction clutch 27. It can be appreciated from FIG. 3 that, at this moment, the output 17 of the intermittence device 16 moves at the same speed as the input 15 and kinematic chain 29, whereby no relative motion exists between the discs of the engaged friction clutch. Through the first 60°, the dogs move from the position shown at A to that shown at B in FIG. 4. Through the following 120° rotation, while the clutch 4 is disengaged by the co-operation of the roller 12 with the upper portion of the contour 11 of the cam 11, the output 17 of the intermittence device 16 decelerates and lags through 60°, whereby when the dog 9 is in the position shown at D, the dog 10 is in the position C. at C the dog 10 is stationary while the dog 9 from D continues moving at constant speed. From FIG. 3, it appears that when the dog 10 arrives at C, the output 17 of the intermittence device is stationary and so remains through 60°. In this time interval, timely with the clock signal K2, the friction clutch 27 is de-energized automatically, whereby the dog 10 remains stationary irrespective of the successive variations of motion of the output 17.

Each time the dog 9 moves through the space A-B, the roller 12 co-operates with the recess 111 of the cam 11 and the disc 204 approaches the disc 104. From B to A the disc 204 moves away and remains away from the disc 104, so that when the dog 9 goes through C, it does not interfere with the dog 10 which is at a standstill.

To prevent mechanical and/or electromagnetic inertia from modifying the position of the dog 10 at C upon disengagement of the friction clutch 27, the disc 104 may be advantageously provided integrally with a peripheral projection 31 (FIG. 1) which, when the roller 12 is inserted in the cam, abuts against a projection 32 secured to the support of the roller 12.

Figure 5:
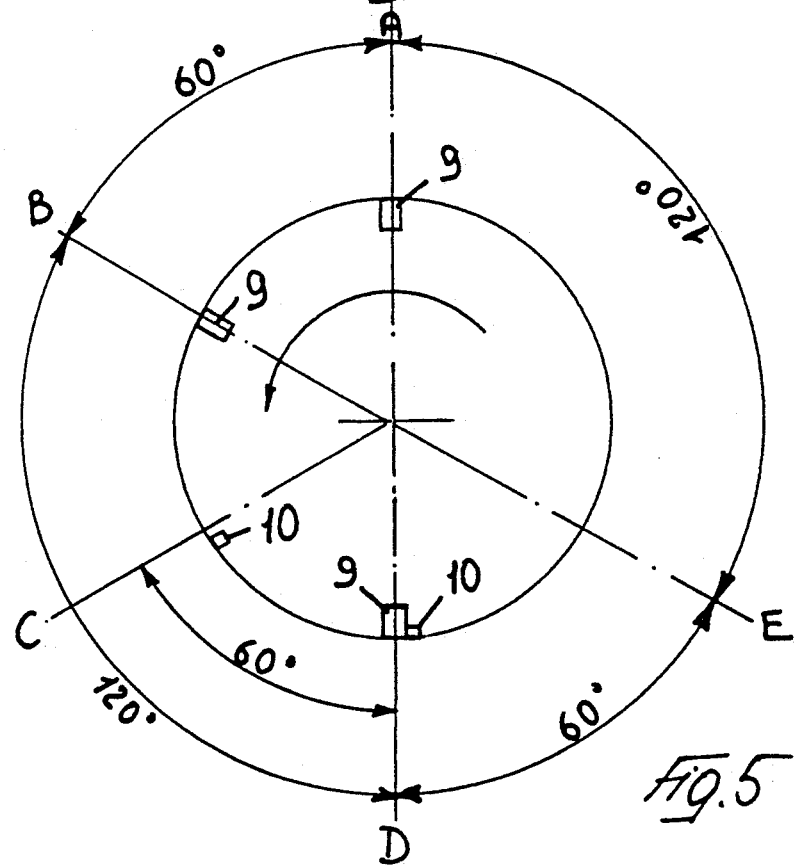

Upon reception of a signal indicative of the presence of an article from the terminal 23 (FIG. 1), the logic control 22 waits for the clock signal K1 from the group 19, 20 which indicates the presence of the roller 12 in the recess 111 of the cam 11, and timely with said signal said logic 22 causes the energization of the friction clutch 28 and the retraction of the roller 12, whereby the projection 32 moves away from the projection 31. It can be noted in FIG. 3 that the output 18 of the intermittence device, starting from said signal K1, remains at a standstill through 60°, whereby while the dog 9 of the dog clutch 4 moves from A to B (FIG. 5), the dog 10 keeps still at C. Thereafter, while the dog 9 moves from B to D and travels through 120° (remember that the dog clutch 4 is now engaged), the dog 10 moves from C to D with such an acceleration (FIG. 3) as to reach the same rotational speed as the dog 10, so that when both dogs will contact with each other at D they move at the same speed and are not subjected to those harmful stresses that occur in the known art. At D the clock signal K2 is received. From that moment, while the dogs 9 and 10 move from D to E, the output 18 of the intermittence device moves at the same speed as the input. During this time interval, timely with the clock signal K2, the friction clutch 28 de-energizes automatically. The dog 10 of the dog clutch is thus disconnected from the output 18 and is under the control of the dog 9 which drags it into rotation as required, timely with the other components of the machine.

It is to be understood that a single intermittence device may be used, having a control logic 22 capable of operating during the intervals a- and c- of the movement of the output of said intermittence device. This modified embodiment, with respect to the embodiment illustrated herein has the disadvantage of a less timely action. A further modification may be made in the control for the engagement and disengagement of the dog clutch 4, which may not be provided of the cam and may be provided with a conventional axial-shift fork which is moved by an actuator connected to the terminal 30.

I claim:

1. In a synchronizer for activating and deactivating a dog clutch (4) for timely controlling a rotating knife (1) and a group forming and feeding wrappers in an article-wrapping machine, said clutch including a driven disc (104) and a driving disc (204) being axially movable away from said driven disc the improvement comprising said driving and driven discs being normally coupled with each other through at least one respective dog (9, 10), and wherein said driven disc (104) is connected, through a positive drive (29), and with the intermediary of at least one electromagnetic friction clutch (27), to the output of at least one intermittence device (16) having an input connected, with a second positive drive (14), to a driving shaft (6) of the dog clutch, said output of the intermittence device being subjected to the following successive variations of motion at predetermined suitable angular intervals:

a—it proceeds at the same speed as the input;
b—it decelerates down to a stoppage;
c—it keeps still;
d—it accelerates up to the same speed as the input means (19, 20, 21) for generating clock signals (K1, K2) at said steps a- and c- at the output of the intermittence device, said signals being transmitted to a control logic (22) having connected thereto a terminal (23) of a sensor which detects the presence or the absence of an article and having terminals (25, 30) stemming therefrom to control both said electromagnetic friction clutch (27) and a control means (13) for engaging and disengaging the dog clutch, said control logic being such that either the disengagement or the engagement of the dog clutch in the cases of either absence or presence of an article, respectively, occur timely with said clock signals, when the electromagnetic friction clutch has been engaged and the output of the intermittence device moves at the same speed as the input to avoid undesired interferences between the dogs of said clutch, while, as a protection of the friction clutch, the latter is engaged and disengaged, timely with said clock signals (K1, K2), during the time intervals wherein the output of the intermittence device and the driven disc of the dog clutch are in the same condition of movement or of rest.

2. A synchronizer according to claim 1, wherein the driven disc (104) of the dog clutch is connected to said positive drive (29), through respective ones of said electromagnetic clutches (27, 28), to the outputs (17, 18) of a double intermittence device (16), wherein said outputs are characterized by said variations of motion (a–d) equal but out-of-phase 180° from each other, whereby while one output is at a standstill, the other output is moving and while one of them accelerates, the other decelerates.

3. A synchronizer according to claim 1, wherein the dog clutch (4) is controlled by means of a cam (11) whose contour comprises a lower portion (111) having an amplitude of 60° an timed with one of the clock signals (K1) generated by said generating means; and a roller (12) acting, under command, on the contour of said cam, said roller being provided with a projection (32) which, when said roller is operated to disengage the dog clutch, interferes with a projection (31) provided on the periphery of the driven disc (104) of said clutch when the driven disc has been stopped.

* * * * *